United States Patent [19]

Moser

[11] Patent Number: 5,346,233
[45] Date of Patent: Sep. 13, 1994

[54] SLIDER FOR ADJUSTING THE POSITION OF THE DUAL AXLES OF A SEMI-TRAILER

[76] Inventor: Donald W. Moser, 1720 Farmington Rd., Pottstown, Pa. 19464

[21] Appl. No.: 822,963

[22] Filed: Jan. 21, 1992

Related U.S. Application Data

[63] Continuation-in-part of Ser. No. 525,385, May 17, 1990, abandoned, which is a continuation-in-part of Ser. No. 335,236, Apr. 10, 1989, abandoned.

[51] Int. Cl.[5] .............................................. B62D 33/08
[52] U.S. Cl. .............................. 280/149.2; 180/24.01; 180/24.02
[58] Field of Search ................. 280/149.2, 407, 407.1, 280/405, 423.1, 456.1; 180/906, 24.01, 24.02, 167

[56] References Cited

U.S. PATENT DOCUMENTS

| | | | |
|---|---|---|---|
| 2,153,468 | 4/1939 | Heyn | 180/14.1 |
| 2,275,302 | 3/1942 | Magnuson | 280/839 |
| 2,291,626 | 8/1942 | Huber | 180/14.1 |
| 2,371,261 | 3/1945 | Peterson | 212/265 |
| 2,753,064 | 7/1956 | Lesser | 414/475 |
| 2,832,610 | 4/1958 | Le Tarte | 280/407.1 |
| 2,835,504 | 5/1958 | Acker | 280/81.1 |
| 2,962,295 | 11/1960 | Tenenbaum | 280/81.1 |
| 3,066,953 | 12/1962 | Chosy | 280/418 |
| 3,203,711 | 8/1965 | Chew | 280/418.1 |
| 3,318,613 | 5/1967 | House | 280/81.6 |
| 3,402,944 | 9/1968 | Day | 280/423.1 |
| 3,612,569 | 10/1971 | Marinelli | 280/423.1 |
| 4,033,625 | 7/1977 | Fikse | 298/22 R |
| 4,097,840 | 6/1978 | Chappelle | 340/431 |
| 4,130,211 | 12/1978 | Abascal | 414/475 |
| 4,132,326 | 1/1979 | Pinto | 414/536 |
| 4,204,697 | 5/1980 | Santerre | 280/149.2 |
| 4,492,507 | 1/1985 | Landoll et al. | 280/149.2 |
| 4,641,846 | 2/1987 | Ehrhart | 280/149.2 |
| 4,662,670 | 5/1987 | Kemner | 296/35.3 |
| 4,669,748 | 6/1987 | Levee | 280/423.1 |
| 4,714,140 | 12/1987 | Hatton et al. | 180/167 |
| 4,854,407 | 8/1989 | Wagner | 177/141 |
| 4,943,202 | 7/1990 | Galloway | 414/475 |
| 4,944,522 | 7/1990 | Hart | 280/149.2 |
| 5,035,439 | 7/1991 | Petrillo | 280/149.2 |

*Primary Examiner*—Karin L. Tyson
*Attorney, Agent, or Firm*—Scott J. Fields

[57] ABSTRACT

An slider for adjusting the weight distribution of a semi-trailer. The slider comprises an apertured track which extends longitudinally along the bottom of a trailer and a dual axle carriage slidably coupled to the track. A pneumatically operated pin is attached to the carriage for selectively extending and retracting a pin into the aperture. The slider further includes a hydraulic cylinder for sliding the carriage along the track while the pin is retracted whereby the position of the carriage and the dual axles can be slidably adjusted.

9 Claims, 9 Drawing Sheets

SLIDER FOR ADJUSTING THE POSITION OF THE DUAL AXLES OF A SEMI-TRAILER

This application is a continuation-in-part of co-pending U.S. Ser. No. 07/525,385 filed May 17, 1990, which is incorporated herein by reference as if set forth in full, which is a continuation-in-part of U.S. Ser. No. 07/335,236, filed Apr. 10, 1989, now abandoned.

FIELD OF THE INVENTION

The present invention is directed to mechanisms for adjusting the relative position of the rear axles on a dual axle semi-trailer. In particular, the present invention is directed to a mechanism which permits the rapid and easy reallocation of weight on a semi-trailer.

BACKGROUND OF THE INVENTION

Presently, there are over one million tractor trailers in operation in the United States. Many of these tractor-trailers are owned by independent owner-operators. Tractor-trailers are subject to extensive federal and state weight regulations. The violation of these weight regulations can result in substantial fines and penalties to the operator or owner. When a tractor-trailer combination is loaded very near to its limit under law, it will frequently be weighed. Under law, the weight of the loaded trailer must be appropriately distributed under a calculation known as the "bridge formula". The bridge formula determines the distribution of weight within the trailer and factors in the distance between the cab and the rear axles of the semi-trailer.

When a truck is stopped on the road for a random weight measurement, it may have too much weight distributed over the rear dual axles. If the weight distribution falls outside the acceptable limits under the bridge formula, the truck will not be permitted to continue until the weight has been properly redistributed. Rather than redistribute the weight within the trailer itself (which would be a monumental task), the operator usually adjusts the weight by moving one or both of the axles of the semi-trailer.

Unfortunately, the movement of the axles when a trailer is fully loaded is itself a considerable and time consuming task. Most semi-trailers comprise a wheeled tandem affixed to a carriage which is slidably adjustable along an apertured track on the trailer and which is retained in position by pins inserted into the apertures.

Presently, the vast majority of trailers are readjusted in the following manner. Initially, the operator, via a hand activated lever or mechanism, removes the pins thus freeing the carriage to be adjusted relative to the trailer bed. After the pins are removed, the rear tandem is locked into place by the application of the brakes. The trailer bed is then slid over the locked dual tandem wheels using the power of vehicle cab. Once the rear tandem is moved into the correct position, the pins are then reinserted by hand back into a different pair of apertures so that the trailer position is locked.

There are several problems associated with this method for readjusting the position of a rear tandem. Initially, this method relies largely upon trial and error before the correct positioning is achieved. Because this method relies upon the power of the vehicle cab to slide the trailer, precise incremental movements of the trailer are not possible. Furthermore, it is frequently difficult to manually remove the pins from the apertures. This may be particularly problematic in cold or inclimate weather. Often the pins may be frozen, locked or rusted into position.

In addition, due to the dangerous nature of this method, there has heretofore been a need to seal off the ends of the tracks, because the trailer could slide completely off the rear tandem as it was pulled or pushed by the vehicle cab. In many trailers, the rearmost two sets of holes are effectively sealed off in order prevent this eventuality, thus limiting the range which the dual tandems can be extended. Finally, this method often leads to "blown" vehicle engines resulting from the large amount of force required to slide the trailer bed over the locked rear wheel tandem.

Various alternative methods have also previously been devised to redistribute the weight of a semi-trailer. U.S. Pat. No. 3,203,711, for example, discloses a floating axle attachment in which a fifth floating axle is slid beneath the semi-trailer. This particular method is expensive and requires a specialized cab and trailer configuration.

Another type of prior art device adjusts the location of the trailer coupling in order to effectuate weight distribution and transfer. See, U.S. Pat. Nos. 2,832,610; 4,662,670; 3,402,944 and 2,153,468. The devices disclosed in these patents are similarly complex and require expensive hydraulic cab configurations. U.S. Pat. No. 2,153,468 discloses a load redistribution system which incorporates a separate trailer dolly which rides on the main trailer bed.

A third type of prior art device is directed to a system which adjusts the length of the chassis or trailer bed. See U.S. Pat. No. 2,371,261. This method is similarly expensive and requires specialized trailer configurations.

OBJECTS AND SUMMARY OF THE INVENTION

There has been a long felt need for a power actuated device which can be utilized on a semi-trailer to easily and safely uncouple and readjust the position of the rear tandem of axles on a semi-trailer and which is simpler to operate and less expensive than prior art methods. Such a system could be easily retrofitted onto an existing trailer. There has also been a long felt need for a device for moving the rear tandem of axles on a semi-trailer which can be activated with minimal effort on the part of the operator.

In view of the above long felt need, it would also be desirable to have a device which can be activated in the cab of the trailer or at a convenient location on the semi-trailer itself.

It would further be desirable to provide a device for a trailer tandem including hydraulic means for moving or adjusting the dual tandem which can be retrofitted onto existing trailers.

It is therefore an object of the present invention to provide a slider which can be utilized to disconnect, longitudinally adjust, and reconnect a slidable rear tandem of wheels on a semi-trailer.

It is yet another object of the present invention to provide an apparatus which can be utilized to uncouple a tandem of rear axles and which can easily and safely reposition the rear tandem.

It is still another object of the present invention to provide a dual axle slider and repositioning means which can either be controlled from within the truck cab, or alternatively, from the side of the trailer.

In view of the foregoing objects and in accordance with the present invention, a slider for adjusting the position of a dual tandem of rear axles on a semi-trailer is disclosed. The invention comprises a power activated slider mechanism for adjusting the position of the dual axles of a semi-trailer of the type having a track located on the underside of said semi-trailer, said track having a plurality of longitudinally extending apertures, a carriage supporting a dual rear axle, said carriage being slidably affixed to said track, and pin means affixed to the said carriage, said pin means being insertable into said apertures for fixing the position of said rear axles with respect to said track, wherein the slider mechanism comprises: means affixed to said carriage for selectively retracting and extending said pin means whereby said carriage can be longitudinally adjusted along said track; and means affixed to the underside of the semi-trailer for selectively adjusting the longitudinal position of said carriage supporting said dual rear axle along said track.

In more preferred embodiments, the present invention includes an expandable activation cord which may be utilized by the operator to walk along the side of the trailer as it is being shifted. The present invention is particularly configured to provide a retrofittable system which may be placed on an existing trailer.

DETAILED DESCRIPTION OF THE INVENTION

Figure 1:
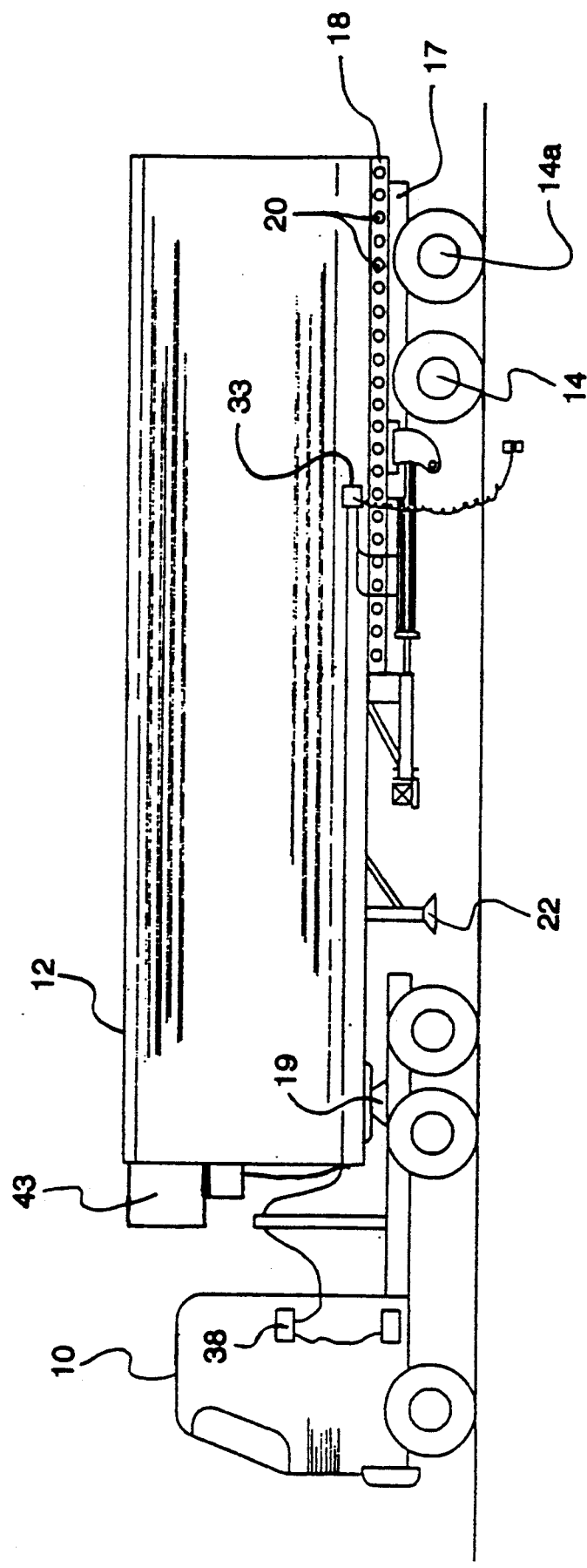
FIG. 1 is a side perspective view of the automatic slider of the present invention affixed to a tractor and semi-trailer having rear tandem axles and which also illustrates alternative placement configurations for the electronic switch.
Figure 1A:
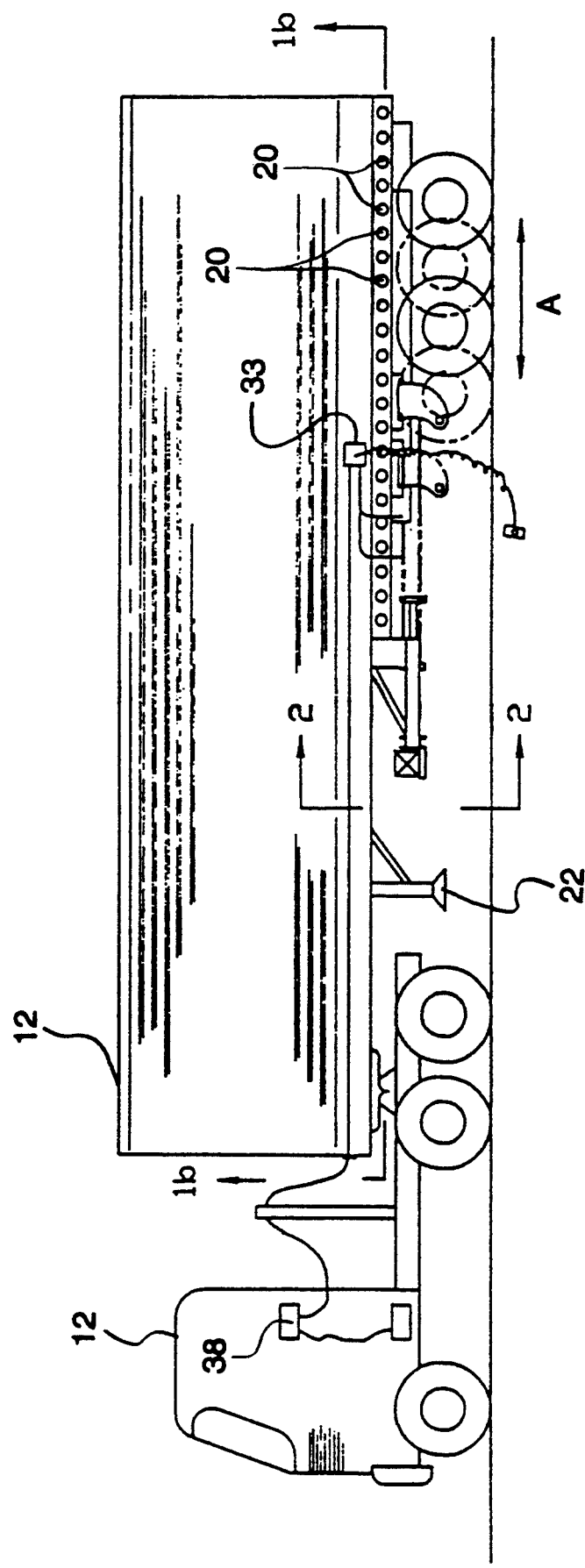
FIG. 1a is a side perspective view of the tractor and semi-trailer of FIG. 1 illustrating the rear tandem adjusted in two positions.

The slider of the present invention is described with reference to the enclosed Figures wherein the same numbers are used where applicable. The present invention is designed to be affixed to a tractor-trailer. Referring to FIGS. 1 and 1a, side perspective views of a tractor or cab 10 and semi-trailer 12 which may be utilized with the present invention are disclosed. The invention is preferably intended to be utilized on a double-axle semi-trailer. As noted in the Background of the Invention section, such trailers are subject to extensive federal and state weight regulation, and are required to specifically comply with weight restrictions calculated pursuant to the so-called "bridge formula".

Figure 1B:
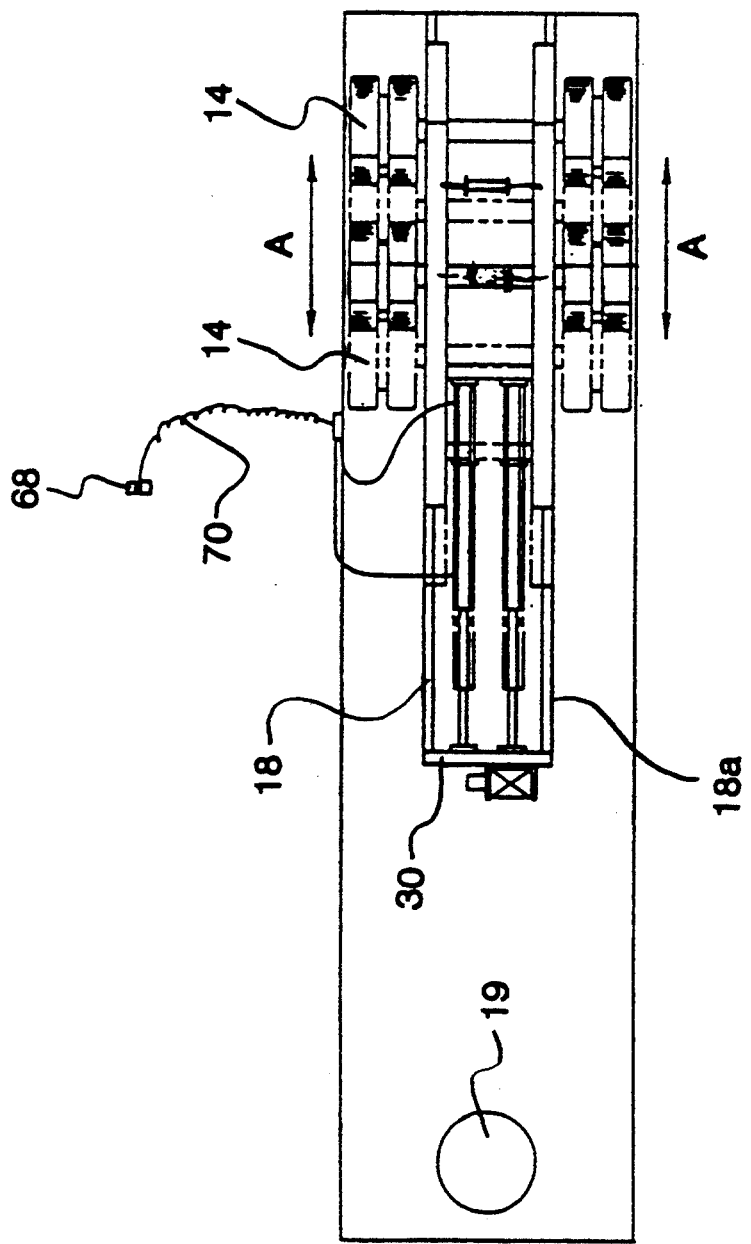
FIG. 1b is an underside plan view of the tractor and semi-trailer along line 1b—1b of FIG. 1.

As shown in FIGS. 1, 1a and 1b, the trailer 12 has a tandem set of axles 14, 14a (eight wheels 16a–16d) which are retained on a carriage 17. The carriage is slidable along two tracks 18 and 18a. Tracks 18 and 18a extend along opposite sides of the trailer. Tracks 18 and 18a, have a plurality of aligned apertures 20 through which retaining pins can be inserted and retracted in order to maintain and fix the position of the wheels. The apertures 20 on the trailer extend completely along the tracks (18 and 18a). In this respect, the rear most apertures 20 on the trailer 12 of the present invention are not sealed off. Trailer 12 further includes a retractable landing gear 22 which is utilized to support the trailer in an upright position when the trailer is not supported by cab 10. A hitch mechanism 19 is also located on the trailer for hitching the trailer to cab 10.

Figure 2:
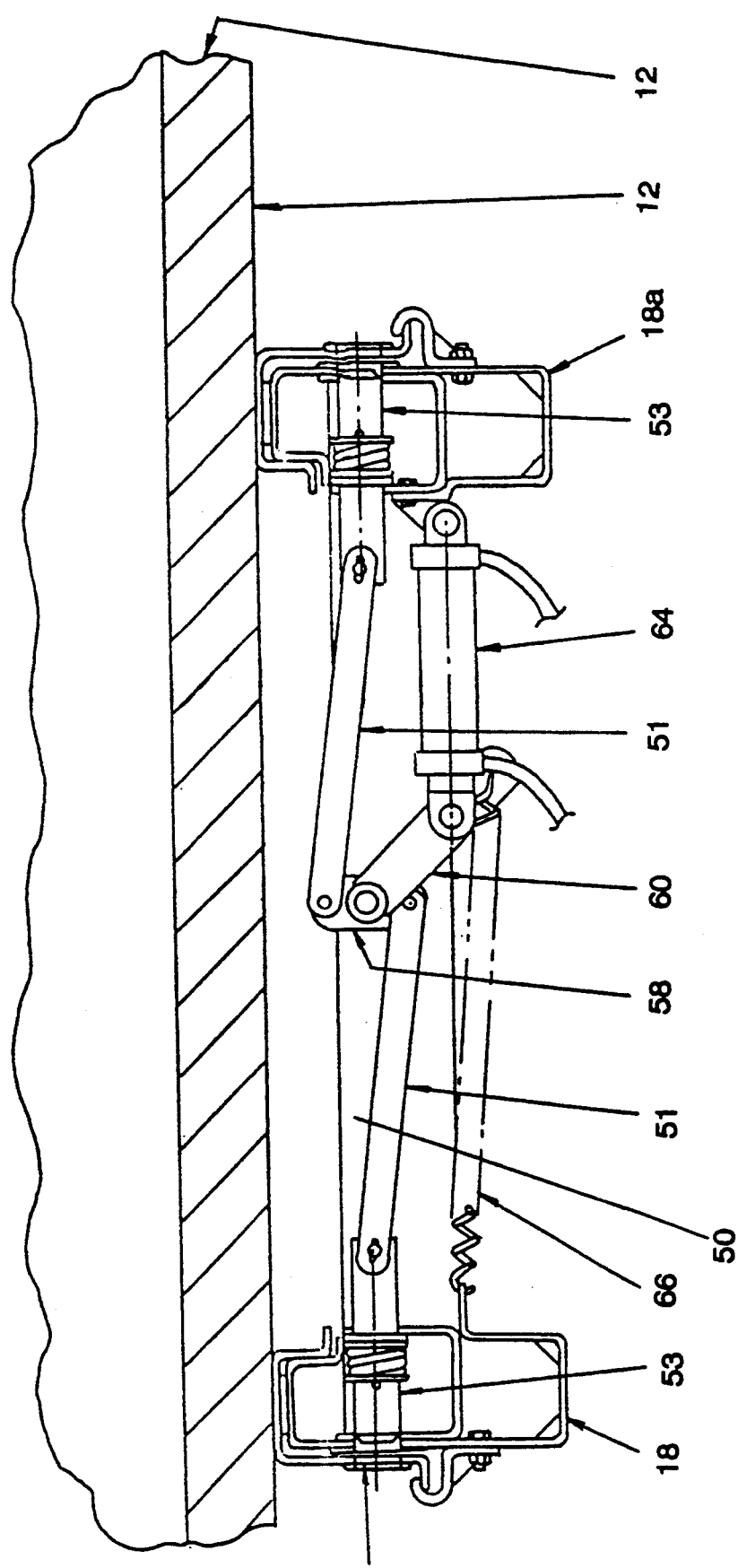
FIG. 2 is a rear perspective view along line 2—2 of FIG. 1a which illustrates the pneumatically activated pin release mechanism of the preferred embodiment in an activated position.
Figure 3:
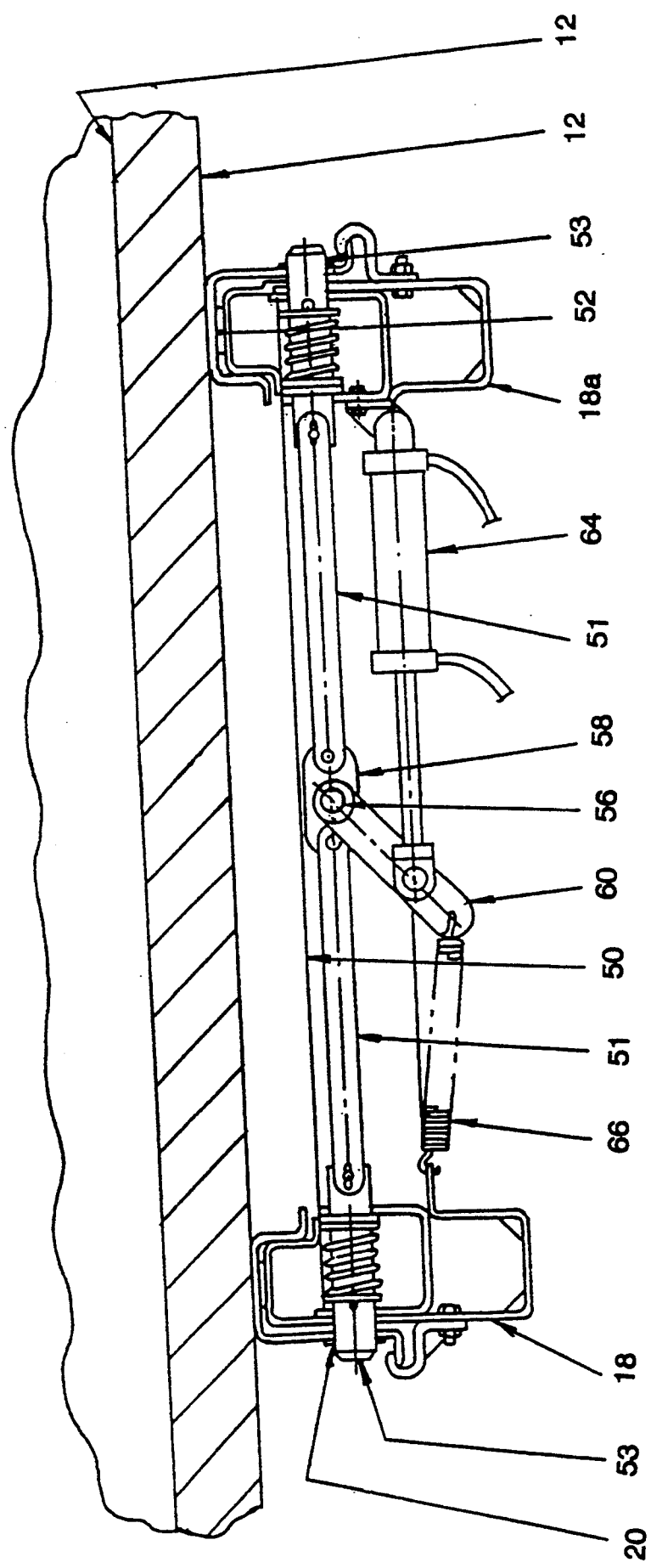
FIG. 3 is a perspective view of the pneumatically activated release mechanism of the present invention along line 2—2 of FIG. 1a in a de-activated position.
Figure 4:
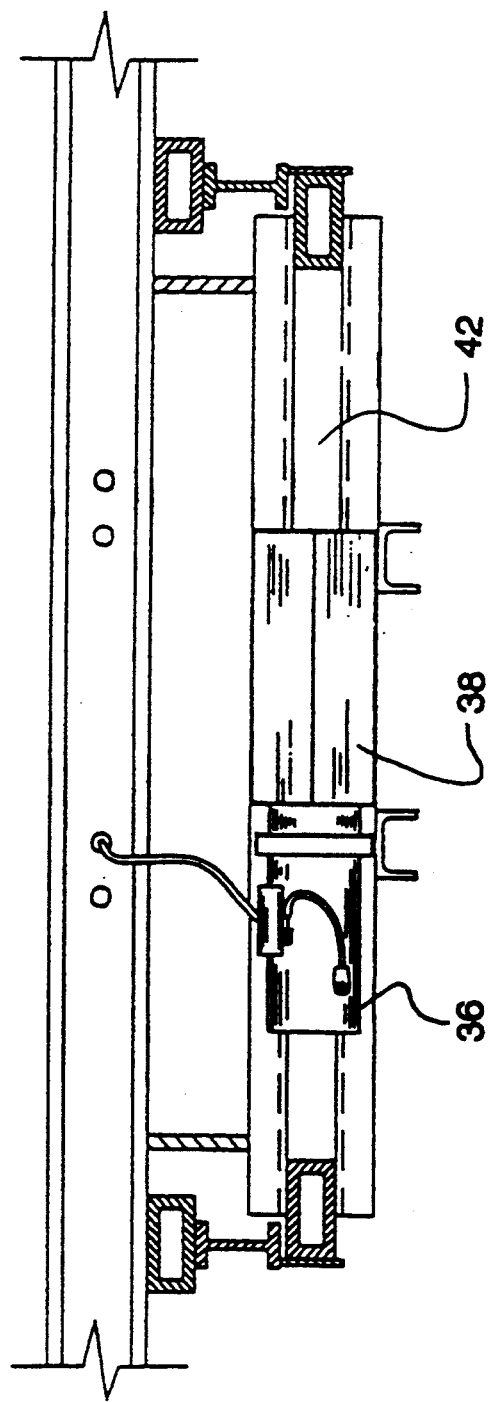
FIG. 4 is a perspective view along line 2—2 of FIG. 1a of the power pack and hydraulic reservoir utilized to move the hydraulic cylinders of the present invention.
Figure 5:
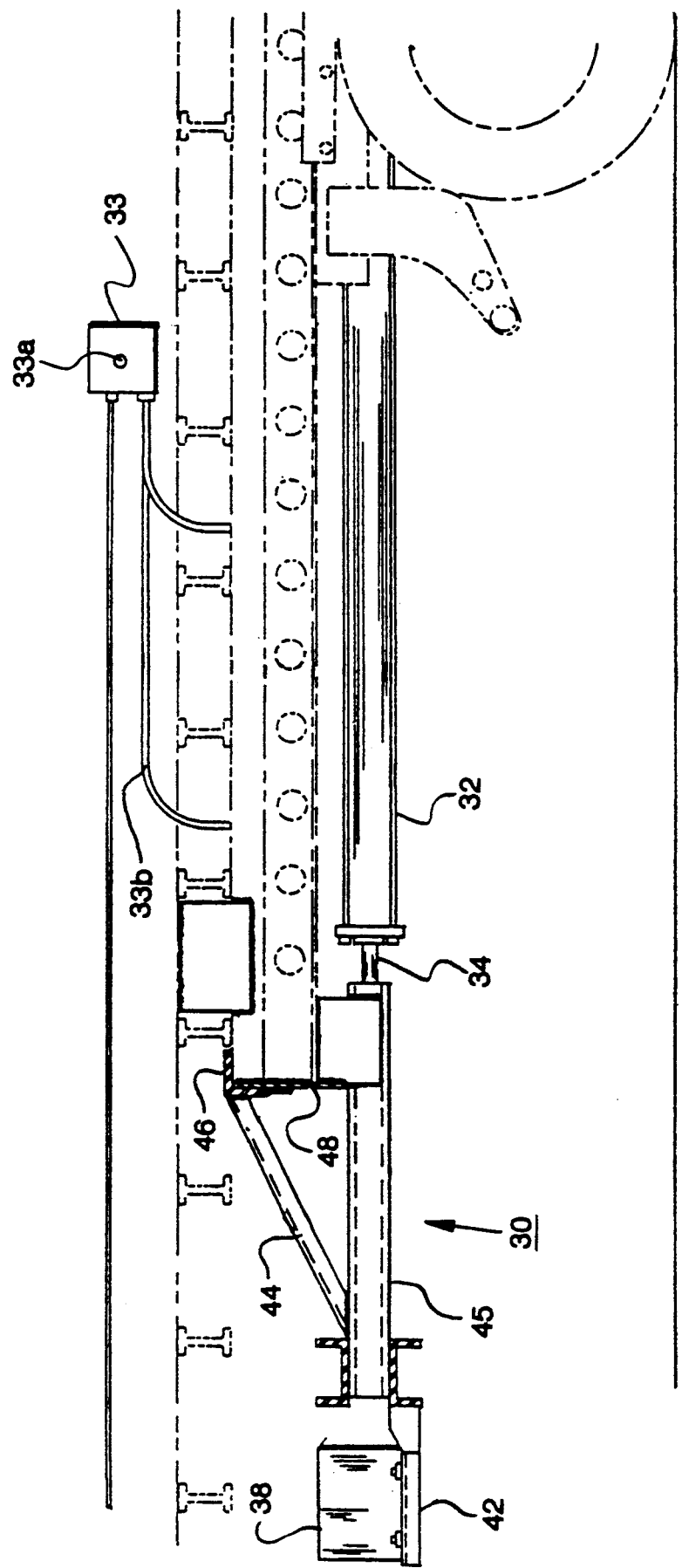
FIG. 5 is an enhanced side perspective view of the power pack, reservoir and cylinder of the present invention with bracing.

The present invention is now described in detail. In a simplest embodiment, the present invention comprise two essential components. Initially, as shown in FIGS. 4 and 5, the invention in a preferred embodiment comprises means 24 for longitudinally adjusting the position of the rear tandem. Referring to FIGS. 2, and 3, the invention further includes a means 26 for automatically retracting and inserting the pins in order to lock the position of the carriage with respect to the tracks 18, 18a. It is envisioned that in operation and use, both means may be affixed as a unit and retrofitted onto existing trailers.

Referring to FIGS. 1a, 1b, 4 and 5, the means 24 for longitudinally adjusting the position of the dual tandem is shown in greater detail. An exemplary system includes a frame and bracket system 30 to which two hydraulic cylinders 32, slidably coupled to piston rods 34, are attached to the frame and bracket 30. The hydraulic cylinders 32 are utilized in association with a power pack 36 and hydraulic reservoir 38 which are supported on a shelf 42 affixed to frame and bracket system 30.

The preferred embodiment is shown in greater detail in FIG. 1, 1a and 5. FIG. 1a displays an side view of the trailer and slider of the present invention. The Figure shows the preferred longitudinally adjusting means 24 including two hydraulic cylinders 32, associated with a power pack 36 and reservoir 38 which are utilized to longitudinally shift the position of the dual axles of the vehicle.

The hydraulic cylinders 32 and power pack 36 of the preferred embodiment are now described in detail. The power pack 36 is preferably a power pack such as the Model 4Z339 manufactured by Dayton, Inc. This power pack operates on 12 Volts DC. The power for the power pack 36 will be provided by the vehicle's electrical system 40. Alternatively, some trailers such as refrigeration vehicles provide their own power source which can be utilized 43. The preferred power pack 36 features a 4 way solenoid valve for powered operation of the double acting cylinders 32 in both directions. The power pack is utilized in association with a heavy duty hydraulic reservoir 38 such as the Dayton Model #4Z188. The reservoir 38 has a four gallon capacity.

The frame and bracket system 30 which support the power pack 36 and reservoir 38 are now described in detail with reference to FIGS. 4 and 5. The frame and bracket system 30 include a shelf 42 which supports the power pack 36 and reservoir 38 and which is suspended from the I-beam tracks 18, 18a. Each of the tracks contain the pin apertures 20 which are used to lock the position of the dual tandems. The shelf 42 is supported on a horizontal support 45 which is suspended from a diagonal cross piece 44 and bracket 46. The horizontal support 45 is further supported by a welded plate 48 which is attached to tracks 18, 18a.

As noted above, the hydraulic system used in association with the longitudinally adjusting system 24 will preferably be utilized in association with two double acting cylinders 32. An example of a cylinder known to work with the present invention is the Model No. 460DB manufactured by Cross Manufacturing, Inc. of Lewis, Kan. This cylinder includes a four inch bore and rod diameter, a stroke length of 60 inches, and a retraction length of 58 inches. Each cylinder can exert 25,000 lbs. of pressure in both the extension and retraction directions. This is substantial enough power to longitudinally move the rear tandem even with a fully loaded trailer.

Further, the bracket 46, cross piece 44 and place 48 should preferably be connected and welded such that the trailer wheels 14, 14a can be moved without the need for the locking pins 53. Thus in the event that the pins cannot be reinserted into the apertures, the rear tandem may be held rigid in position. While the present invention is being described in the context of a system having a tandem of hydraulic cylinders 32, it is to be appreciated that the present invention may be utilized with any number of hydraulic cylinders.

A particular feature of the present invention is the fact that it may be constructed as a retrofittable unit which may be retrofitted onto existing trailers. In such a retrofittable unit frame and bracket 30 including shelf 42, crosspiece 44, bracket 46 and welded plate 48 could be included in a kit along with the hydraulic unit, including power pack 36 and reservoir 38 and cylinders 32. The retrofittable kit would also include the novel pin retraction means 26 discussed below. The kit could also include a switch box 33 with switch means to be described below.

As noted above, the present invention is also utilized in association with a means 26 for automatically retracting and inserting the locking pins 53. As shown, means 24 is affixed to the carriage 17 and may be activated by the same switch mechanism used to activate means 26. Referring to FIG. 2, a pneumatically operated pin retraction means 26 in accordance with the present invention is shown in an extended position. In a preferred embodiment, the mechanism is used to retract and insert the pins 53 for purposes of locking the position of the rear tandems with respect to the longitudinal tracks 18.

The pin retraction means 26 in a preferred embodiment, comprises a mounting brace 50 on which is mounted two arms 51. The mounting brace 50 is supported on slidable frame 52 which slides along tracks 18, 18a attached to the underside of the trailer 12a. The mounting brace 50 extends perpendicularly to the tracks 18, 18a. The mounting brace 50 is attached to the carriage 17 supporting the dual axles.

The arms 51 are each rotatably connected to the locking pins 53 which are biased outward by springs 55. The arms are pivotally connected at their other ends to a central shaft 56 via a fixed hub 58. A rotation arm 60 is connected to the central shaft 56. The rotation arm 60 is utilized to rotate the central hub 58 and shaft 56 and thereby retract the pins 53. A pneumatic cylinder 64 is connected between the slidable frame and the midpoint of rotation arm 60. The pneumatic cylinder of the preferred embodiment is powered by the braking system in the vehicle. A biasing spring 66 affixed between track 18 and rotation arm 60 biases the pneumatic cylinder 64 in the opposing direction.

Referring to FIG. 3, the pneumatically operated pin withdrawal mechanism 26 of the present invention is illustrated in a retracted or open position. As shown, as the pneumatic cylinder 64 retracts, it rotates the rotation arm 60. The rotation of the rotation arm 60 rotates the hub 58 which pulls the arms 51 simultaneously inward thereby retracting the pins 63. The carriage is thereby free to slide along tracks 18, 18a.

As shown in FIG. 1 and noted above, the present invention may be activated with an electronic control system 38 located on-board in the cab. The in-cab control system could utilize the electrical connections (for rear lights, turn signals, etc.) extending to the trailer.

Figure 6A:
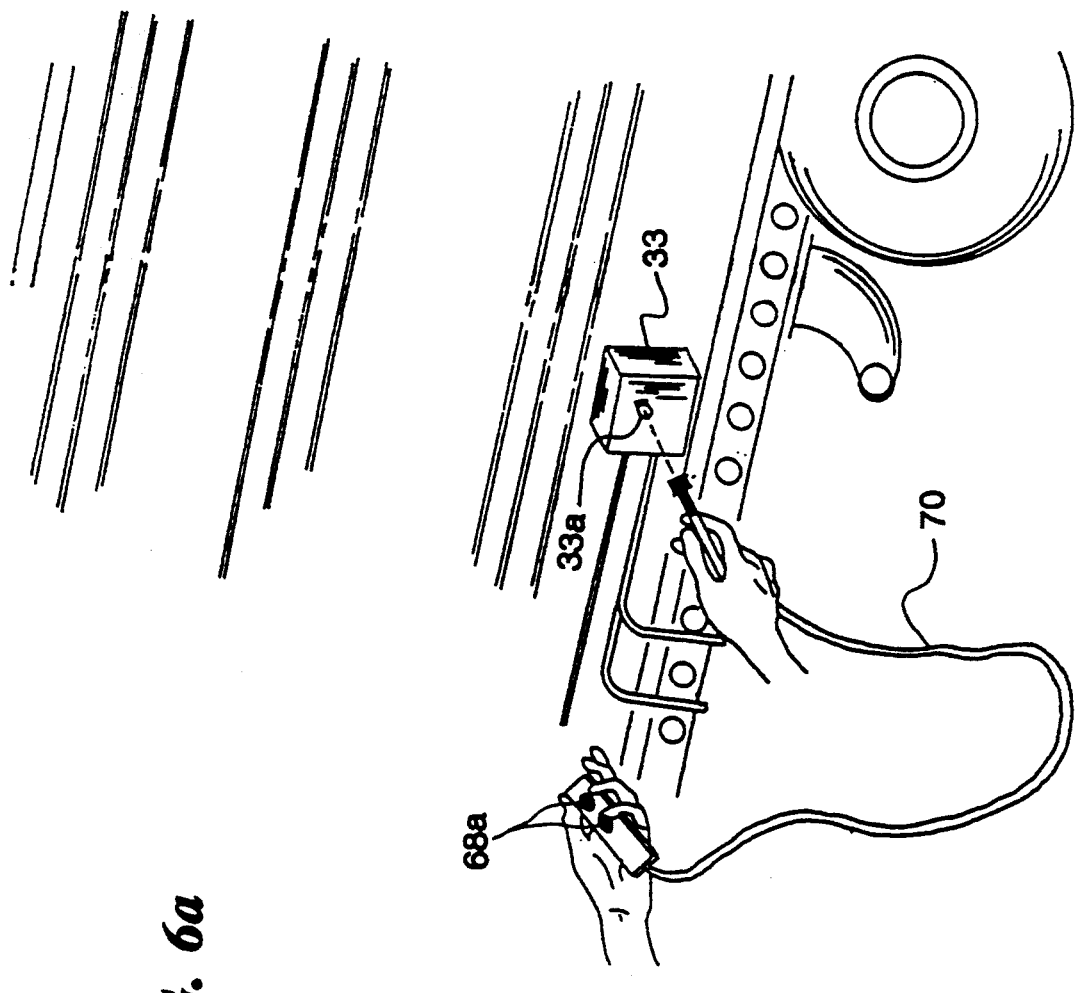
FIGS. 6A and 6B are alternative switch mechanisms and extension cords which may be used to activate the slider of the present invention.
Figure 6B:
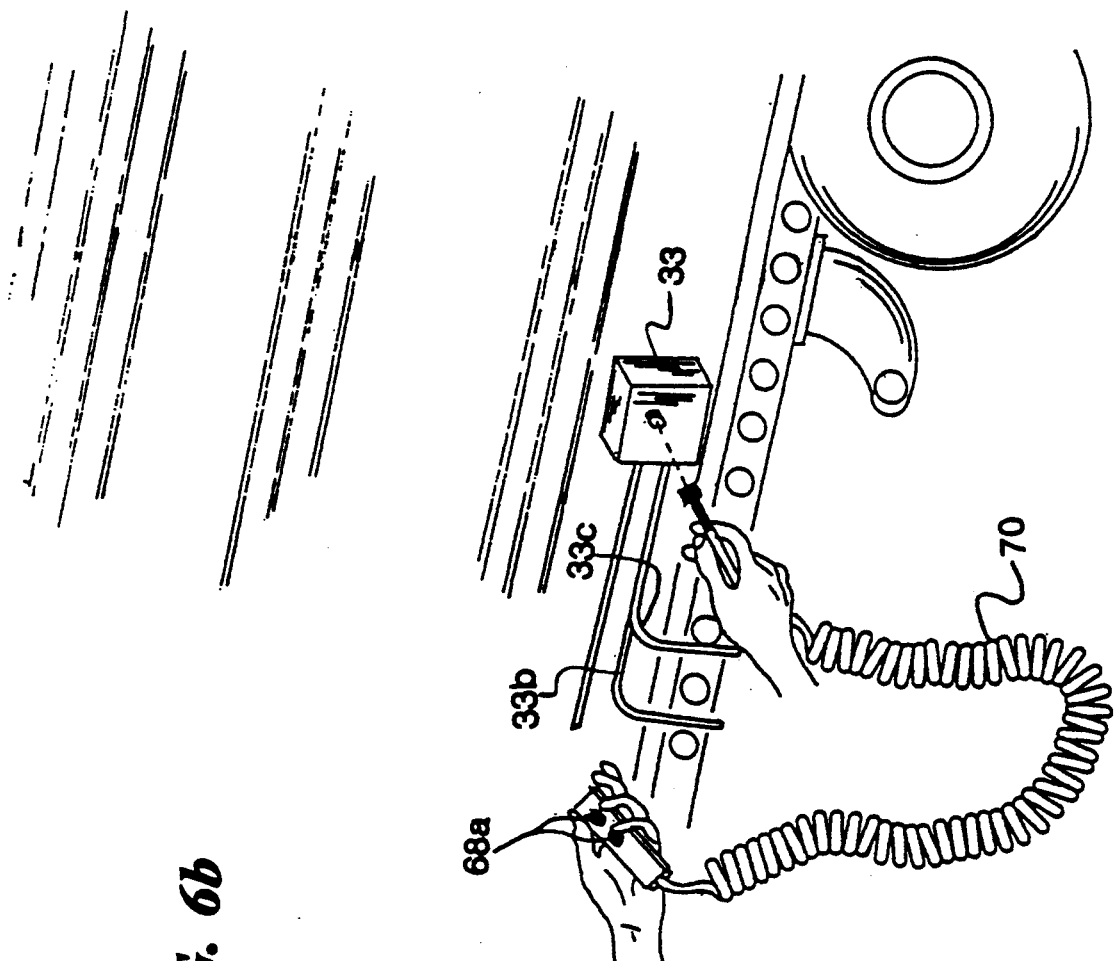

Alternatively, an electronic control box 33 located on the outside trailer may control the longitudinal adjusting means 32 and pin retraction means 26 of the present invention. Either control will be powered by the vehicle's electrical system. Referring to FIGS. 6A and 6B, a preferred external control means 33 is shown in detail. Control means 33, which is a box, includes a socket 33a for attachment of a plug in cable 70. The control box 33 is used in association with a plug in switch 68 and cable 70 which may be used by the operator to activate the system at the trailer itself. The switch 68 will preferably have two buttons 68a, one to activate each of means 24, 26. As shown in FIG. 6B, insertable cable 70 may be expandable. Control Box 33 has connecting lines 33b, 33c which connect the box with means 24, 26. By using the expandable cable 70, the operator may walk along the side of the trailer so as to observe the trailer tandems 14, 14a as they are slid into the appropriate location. In this manner, precise incremental movement of the trailer and tandems may be made as shown in FIG. 1a.

The operation and use of the present invention is now described with reference to the enclosed Figures discussed above. In a typical operating scenario, an operator of a semi-trailer might be pulled over by a law enforcement official, or alternatively, be required to have his vehicle weighed at a state weighing station located along one of the nation's highways. The law enforcement official or weighing official will make a determination of the truck's weight distribution using the "bridge formula". If the weight of the trailer is not properly distributed, the weight distribution of the semi-trailer will have to be adjusted.

To utilize the present invention, the operator will initially unbrake the dual axled wheels 14, 14a of the semi-trailer. Next, either from inside the cab or at the external location on the trailer 33, using one of buttons 68a on switch 68, the operator activates the pin retraction means 26. Specifically, pneumatic cylinder 64 which will receive air pressure from the vehicle's brake lines is activated. Rotation arm 60 is then pulled to the right thereby turning the central shaft 52 and hub 58. The pivotally connected arms 51 are accordingly pulled inwardly, thereby retracting pins 53 from apertures 20. This procedure unlocks the carriage 17.

With pins 53 fully retracted, the operator activates the switch 68 so as to power the hydraulic cylinders 32 in association with the power pack 36 and hydraulic reservoir 38 in order to adjust the longitudinal position of the unlocked rear wheels relative to the trailer body. The carriage 17 with dual tandem wheels 14, 14a is effectively slid under the trailer bed along the tracks 18, 18a (either forward or in reverse), as the wheels move, as shown by arrow A of FIG. Ia, thereby altering the bridge formula. It is to be appreciated that one of the associated features of the present invention is that if the pins are locked into position against an aperture such that they cannot move, the slider may be shifted longitudinally slightly so as to release the locked pin 53 and thereby permit their removal.

When the carriage 17 is at the appropriate location, the driver releases the pneumatic cylinder 64 so as to reinsert the pins in a new set of holes 20, thereby locking the rear wheel tandems 14, 14a. The present invention facilitates the selective movement of the rear tandem.

It is to be recognized by those skilled in the art that numerous embodiments fall within the spirit an scope of the present invention, and that the true nature and scope of the invention is to be determined with reference to the claims appended hereto.

What is claimed is:

1. In a system for adjusting the position of the dual rear axle assembly of a semi-trailer of the type having a track extending longitudinally along the bottom thereof which is provided with a longitudinal array of apertures; a slidable carriage, supporting a dual rear axle assembly having wheels at each end of its axles; said carriage being mounted on said track for sliding motion along said track to a desired position; and pin means affixed to said carriage, said pin means being extendable into said apertures to fix the position of said carriage with respect to said track and being retractable to permit sliding of said carriage along said track; the improvement comprising the combination therewith of:

braking means for holding said semi-trailer fixed while leaving said wheels free to roll along the ground;

controllable carriage-positioning means having a proximal and a distal and being affixed to said semi-trailer and acting between said track and said carriage for selectively adjusting the longitudinal position of said carriage along said track as said wheels thereof roll along the ground said controllable carriage-positioning means comprising a control cable having position-control switch means at the distal end thereof, which switching means are operative from beside said semi-trailer to control the position of said carriage; and pin-control means affixed to said carriage for retracting said pin means to free said carriage for sliding motion during said adjusting of said carriage position, and for selectively extending said pin means into said apertures when said carriage is in said desired position said pin-control means comprises said control cable having pin-control switch means at the distal end thereof and operable from a position beside said semi-trailer to control said pin means.

2. The system of claim 1, wherein said controllable carriage-positioning means comprises at least one hydraulic cylinder having piston means acting between said track and said carriage to effect said adjusting of said longitudinal position of said carriage.

3. The system of claim 1, wherein said pin-control switch means comprises manually-controllable, pneumatically actuatable means coupled to said pin means.

4. The system of claim 2, wherein said pin-control means comprises a control box on said semi-trailer adjacent to said track and said control cable extending from said control box and having control switches at the distal end thereof, operation of said control switches serving to control said pin means.

5. The system of claim 1, wherein said pin control switch manually-operable carriage-position control means operatively connected to said carriage-positioning means to effect movement of said carriage to said desired position.

6. The system of claim 5, wherein said control cable has position-control switch means at the distal end thereof, which switching means are operative from beside said semi-trailer to control the position of said carriage.

7. The system of claim 6, wherein said control cable has pin-control switch means at the distal end thereof and operable from a position beside said semi-trailer to control said pin means.

8. The system of claim 7, wherein said control cable having position-control switch means at the distal end thereof is the same control cable which has said pin-control switch means at the distal end thereof.

9. The system of claim 8, wherein said control cable is an expandable cord.

* * * * *